US010528572B2

(12) United States Patent
Sacheti et al.

(10) Patent No.: US 10,528,572 B2
(45) Date of Patent: Jan. 7, 2020

(54) RECOMMENDING A CONTENT CURATOR

(71) Applicant: MICROSOFT TECHNOLOGY LICENSING, LLC, Redmond, WA (US)

(72) Inventors: Arun Sacheti, Sammamish, WA (US); Yanfeng Sun, Redmond, WA (US); Aaron Chun Win Yuen, Seattle, WA (US); Parthasarathy Govindarajen, Bothell, WA (US); Kun Wu, Redmond, WA (US); Soohoon Cho, Bellevue, WA (US); Malik Mehdi Pradhan, Kirkland, WA (US); Alexandre Michelis, Redmond, WA (US); Gautam Vishwas Vaidya, Redmond, WA (US); Karim Amin Hasham, Bellevue, WA (US); Avinash Vemuluru, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 802 days.

(21) Appl. No.: 14/839,385

(22) Filed: Aug. 28, 2015

(65) Prior Publication Data
US 2017/0060872 A1    Mar. 2, 2017

(51) Int. Cl.
*G06F 16/20*     (2019.01)
*G06F 16/2457*   (2019.01)
*G06N 20/00*     (2019.01)
*G06F 16/248*    (2019.01)
*G06F 16/9535*   (2019.01)

(52) U.S. Cl.
CPC ...... *G06F 16/24578* (2019.01); *G06F 16/248* (2019.01); *G06F 16/9535* (2019.01); *G06N 20/00* (2019.01)

(58) Field of Classification Search
None
See application file for complete search history.

(56) References Cited

U.S. PATENT DOCUMENTS

| 7,730,216 B1 | 6/2010 | Issa et al. |
| 7,788,358 B2 | 8/2010 | Martino |
| 7,886,000 B1 | 2/2011 | Polis et al. |

(Continued)

OTHER PUBLICATIONS

"Second Written Opinion Issued in PCT Application No. PCT/US2016/048802", dated Aug. 7, 2017, 6 Pages.

(Continued)

*Primary Examiner* — Belix M Ortiz Ditren
(74) *Attorney, Agent, or Firm* — Shook, Hardy & Bacon, LLP

(57) ABSTRACT

The technology described herein provides an efficient mechanism for quickly analyzing huge amounts of media content to find media content (hereafter "content" or "media content") that is relevant to a user. The technology analyzes features of a curator to classify curators by interest and/or find curators with similar content recommendations. The curator data can be used to make curator recommendations to users based on the user's interests. The technology described herein collects curator data from multiple content sites and analyzes the data to identify curators that recommend similar content on different content sites.

18 Claims, 9 Drawing Sheets

(56) References Cited

U.S. PATENT DOCUMENTS

| | | | |
|---|---|---|---|
| 8,296,660 B2 | 10/2012 | Macadaan et al. | |
| 8,694,531 B1* | 4/2014 | Stearns | G06F 17/30761 707/732 |
| 9,430,572 B2* | 8/2016 | Liu | G06F 17/30867 |
| 2007/0255807 A1 | 11/2007 | Hayashi et al. | |
| 2008/0182563 A1 | 7/2008 | Wugofski et al. | |
| 2009/0209286 A1 | 8/2009 | Bentley et al. | |
| 2009/0234876 A1 | 9/2009 | Schigel et al. | |
| 2010/0106730 A1* | 4/2010 | Aminian | G06Q 10/10 707/748 |
| 2010/0211563 A1 | 8/2010 | Macchietti et al. | |
| 2011/0010384 A1 | 1/2011 | Luo et al. | |
| 2011/0282944 A1 | 11/2011 | Henderson et al. | |
| 2013/0179441 A1 | 7/2013 | Kuusik | |
| 2013/0254217 A1 | 9/2013 | Xu | |
| 2013/0311572 A1* | 11/2013 | Faller | H04L 65/403 709/204 |
| 2013/0325858 A1 | 12/2013 | Xu | |
| 2013/0339180 A1 | 12/2013 | LaPierre et al. | |
| 2014/0267248 A1 | 9/2014 | Zou et al. | |
| 2016/0323619 A1* | 11/2016 | Lewis | H04N 21/2668 |

OTHER PUBLICATIONS

Balabanovic, Marko, "An Adaptive Web Page Recommendation Service", In Proceedings of the First International Conference on Autonomous Agents, Feb. 5, 1997, 9 pages.

"International Search Report and Written Opinion Issued in PCT Application No. PCT/US2016/048802", dated Dec. 13, 2016, 10 Pages.

* cited by examiner

RECOMMENDING A CONTENT CURATOR

BACKGROUND

Websites with extensive media content increasing rely on curators to build collections of content that reflect a curator's tastes to make it easier for users to find content of interest. The curators can be actual people that can capture stylistic or aesthetic similarities in content that are difficult for a computer to ascertain. The curators can bring people with mutual tastes together. Computers can have a great deal of difficulty recommending curators to users that are new to a site or when little information is known about the user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein provides an efficient mechanism for quickly analyzing huge amounts of media content to find media content (hereafter "content" or "media content") that is relevant to a user. The technology analyzes features of a curator to classify curators by interest and/or find curators with similar content recommendations. The curator data can be used to make curator recommendations to users based on the user's interests.

The technology described herein collects curator data from multiple content sites and analyzes the data to identify curators that recommend similar content on different content sites. The technology described herein can provide a curator recommendation to a user that has never visited a content site previously. A recommendation can include a description of a curator and reasons why the user may like the recommended curator. The recommendation may be provided as part of a search results web page, by a personal assistant, or through an application running on a mobile device. For example, an application associated with a content site could provide a recommendation for a curator of content on the site.

Various curator features may be used to determine that curators within a particular content site or from different content sites are similar. Exemplary curator features include characteristics of users that have a relationship with a curator, amount of followers, amount of content within a collection, digital age (how long a curator has existed as an entity on a content site), and similar. When the same or similar content is recommended by curators, then the curators may be determined to be similar. Other curator data, such as descriptions of the curator, curator interests or goals, etc., can also be used to determine similarity. For example, curators that describe themselves as interested in the arts and crafts movement could receive a similar classification.

In addition to recommending a curator, the technology described herein can recommend specific collections and specific content within a collection.

BRIEF DESCRIPTION OF THE DRAWINGS

Aspects of the technology described in the present application are described in detail below with reference to the attached drawing figures, wherein.

DETAILED DESCRIPTION

Figure 1:
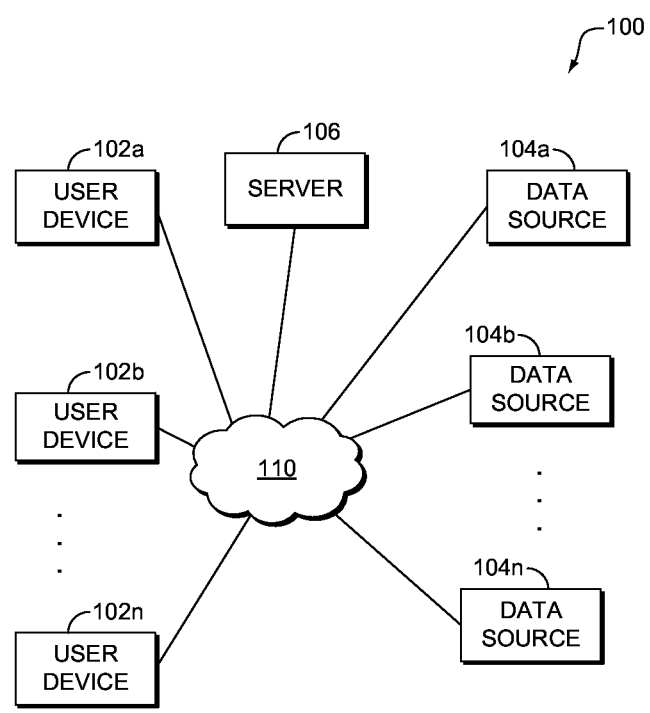
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides an efficient mechanism for quickly analyzing huge amounts of media content to find media content (hereafter "content" or "media content") that is relevant to a user. The technology analyzes features of a curator to classify curators by interest and/or find curators with similar content recommendations. The curator data can be used to make curator recommendations to users based on the user's interests.

The technology described herein collects curator data from multiple content sites and analyzes the data to identify curators that recommend similar content on different content sites. As used herein, a "curator" is an entity that organizes content from a content site into a collection. A collection is a group of content. A curator may be a person, a group of people, or a site-specific content collection machine. An individual curator may generate multiple collections on an individual content site. An individual content site can have hundreds, thousands, or even more curators.

A content site, as used herein, is any site that allows remote access over a computer network to media content.

The media content can include audio content such as songs, video content, and image content. The content may be associated with metadata defining characteristics of the content, such as an originator of the content, for example, an artist, author, photographer, corporation, etc. The content site may be accessible through a web browser, dedicated application, or some other interface.

The technology described herein can provide a curator recommendation to a user that has never visited a content site previously. A recommendation can include a description of a curator and reasons why the user may like the recommended curator. For example, the description could say Curator A is similar to Curator B, whom you have a relationship with on content site X. Of course, the letters in the above example would be replaced with the names of content sites and curators in an actual implementation. The recommendation may be provided as part of a search results web page, by a personal assistant, or through an application running on a mobile device. For example, an application associated with a content site could provide a recommendation for a curator of content on the site.

Various curator features may be used to determine that curators within a particular content site or from different content sites are similar. Exemplary curator features include characteristics of users that have a relationship with a curator, amount of followers, amount of content within a collection, digital age (how long a curator has existed as an entity on a content site), and similar. When the same or similar content is recommended by curators, then the curators may be determined to be similar. Other curator data, such as descriptions of the curator, curator interests or goals, etc., can also be used to determine similarity. For example, curators that describe themselves as interested in the arts and crafts movement could receive a similar classification.

"Contextual signals," as utilized herein, may reflect any attribute of a user (for instance, physical characteristics), the user's historical interaction with the system (e.g., behavior, habits, and system interaction patterns), and/or the user's recent interaction with the system (with "recency" being defined in accordance with a predetermined time frame relative to a given point in time) that may affect the likelihood or probability that the user desires to engage with a particular computer application or computer program. Such contextual signals may include, by way of example only and not limitation, the location of the user of the computing device (determined utilizing, for instance, Global Positioning System (GPS) signals, Internet Protocol (IP) address, or the like), the time of day (either general (for instance, morning or afternoon) or exact (for instance, 6:00 pm)), the date (either exact or generally a particular month, season, etc.), a physical characteristic of the user (for instance, if the user is paralyzed and capable of only voice input, or the like), a task currently engaged in on the computing device by the user, a task recently engaged in on the computing device by the user (again with "recency" being defined in accordance with a predetermined time frame relative to a given point in time), an object the user is currently engaged with on the computing device (for instance, an entity such as a contact, a file, an image, or the like), an object the user was recently engaged with on the computing device, a function currently being performed by the user on the computing device, a function recently performed by the user on the computing device, hardware currently being utilized on the computing device, hardware recently utilized on the computing device, software currently being utilized on the computing device, and software recently utilized on the computing device.

In addition to recommending a curator, the technology described herein can recommend a collection. As mentioned, an individual curator can generate multiple collections. In some instances, the users interests do not map to all of the collections generated by curator. In another example, the users interests map more strongly to a particular collection generated by curator. In these and other situations, a recommendation for a particular collection may be generated. The user can then explore the collection and form a relationship with a collection and/or the curator as desired.

As part of the recommendation process, individual content within a collection can be recommended. For example, a recommendation for a curator or collection can include a picture of a particular media content within a collection or otherwise associated with the curator. In another example, individual content may be recommended as part of a content stream provided to the user. The content can be drawn from curators or collections the user already has a relationship with or from curators and collections the user does not have a relationship with but have been determined to be similar to those the user already has a relationship with.

Aspects of the technology described herein can provide a curator/collection interface. The curator collection interface can allow the user to explicitly provide user interest data that can be used to form recommendations. The recommendations described herein can be presented through the curator/collection interface. In another aspect, the curator/collection interface includes a content stream. The content stream can include selections of content from one or more curators the user has a relationship with. For example, all new content added to a collection the user has a relationship with can be shown in the user's content feed. In another example, all content added to any collection by a curator the user has a relationship with can be included in a content feed. In another aspect, content associated with curators or collections can be individually evaluated for inclusion in the content feed. For example, content matching a user's recently expressed interests can be included in the feed. The user's recently expressed interests can be explicit or implicit. Implicit interests can be derived from analysis of the user's browsing history, shopping history, search history, and such. In another aspect, content can be included because it is similar to content within collections the user has relationships with either directly or through a curator. The interface can provide a link to a content site, curator, and/or collection from which content is taken.

Having briefly described an overview of aspects of the technology described herein, an exemplary operating environment is described below in order to provide a general context for various aspects. Referring to the figures in general and initially to FIG. 1 in particular, an exemplary operating environment is shown and designated generally as exemplary operating environment 100. The exemplary operating environment 100 is but one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 1000 described in connection to FIG. 10, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can facilitate the completion of tasks and make a record of user activities. The user activities can be analyzed to determine when a user accesses content on a content site, forms a relationship with a curator, or performs other tasks (e.g., web browsing, online purchases, travel, etc.) that can be analyzed to determine user interests. Server 106 can comprise server-side software designed to work in conjunction with client-side software on user devices 102a and 102b through 102n so as to implement any combination of the features and functionalities discussed in the present disclosure. For example, the server 106 may run a curator recommendation engine 430, which recommends curators to the user. The server 106 may receive user activity data that describes interactions with and relationships with content sites, content, and curators. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 400 described in connection to FIG. 4. (For example, in one aspect, one or more data sources 104a through 104n provide information about content, content interactions, curators, and user data to the content recommendation engine 430.) In one aspect, the data sources 104a through 104n can be content sites. Data sources 104a and 104b through 104n may be discrete from user devices 102a and 102b through 102n and server 106 or may be incorporated and/or integrated into at least one of those components. The data sources 104a though 104n can comprise a knowledge base that stores information about a venue, a curator, a content, a content site, a user, or other entity related to a user interaction with a curator or content site.

Figure 4:
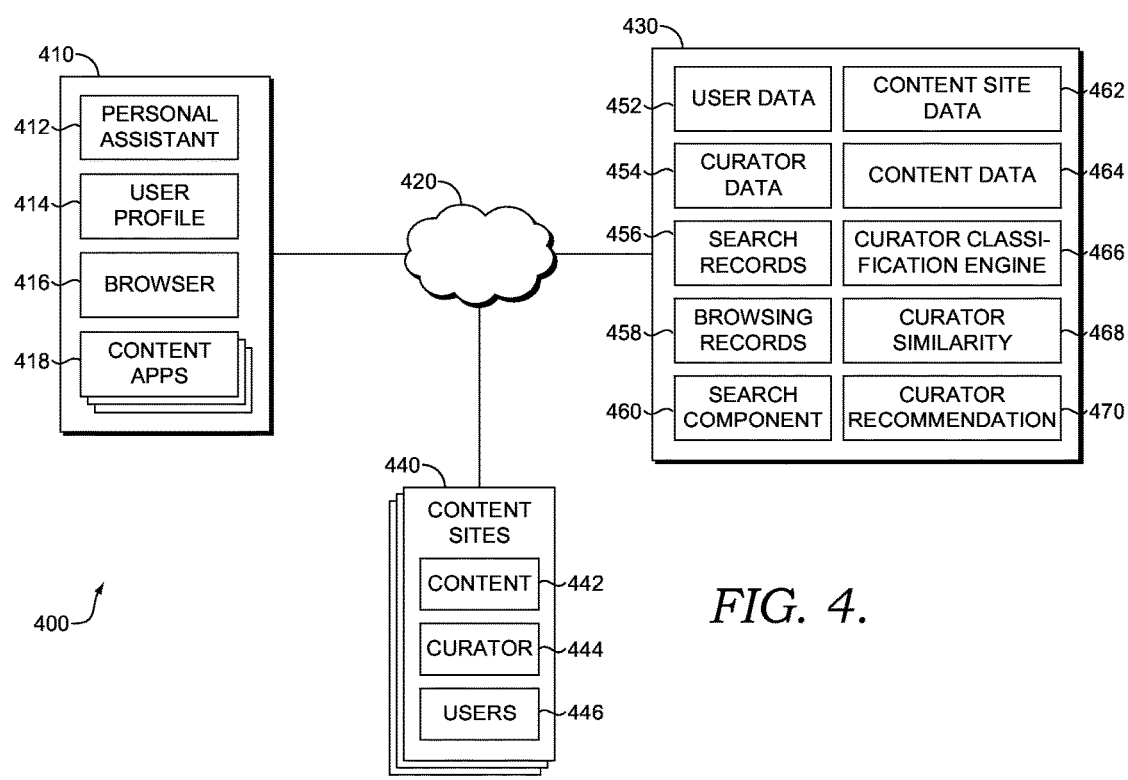
FIG. 4 is a diagram depicting relationships between users and various content sites, in accordance with an aspect of the technology described herein.

Operating environment 100 can be utilized to implement one or more of the components of system 400, described in FIG. 4, including components for collecting user data, collecting curator data, and generating a curator recommendation.

Figure 2:
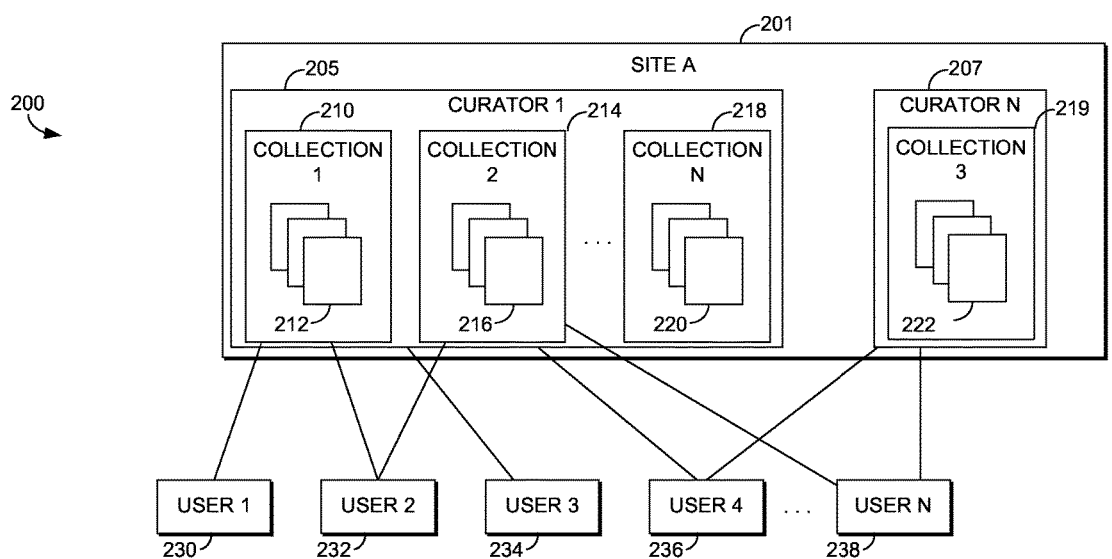
FIG. 2 is a diagram depicting an exemplary computing environment for recommending a curator, in accordance with an aspect of the technology described herein.

Turning now to FIG. 2, the relationship between users and curators is illustrated, in accordance with an aspect of the technology described herein. Computing environment 200 shows a content site A 201. The content site A 201 includes a first curator 205 and an Nth Curator 207. The Nth curator 207 illustrates that a site can have many curators, for example, hundreds, thousands or more. The first curator 205 generates a first collection 210, a second collection 214, and an Nth collection 218. The inclusion of the Nth collection indicates that a particular curator may have numerous collections. The Nth curator 207 is associated with a third collection 219. Each collection includes content. The content may be a subset of content available through a content site. The collection may comprise links or references to content, rather than actual content. The collection allows a user that has a relationship with the curator or the collection to view the content organized by the collection. A curator may generate one or more collections. A user can follow a particular curator, in which case the user may follow all collections generated by the curator or the user could follow a particular collection of content for a particular curator. The curators may periodically add and subtract content from individual collections.

The collections include content, such as pictures, movies, music, etc. A single piece of content from a content site may be included in multiple collections. The first collection 210 includes content 212. The second collection 214 includes content 216, and the Nth collection 218 includes content 230.

The user can have relationships with multiple collections and multiple curators. The relationships shown as lines in FIG. 2 are between users and collections or users and curators. A relationship as used herein means the user has expressed an interest in the collection. The interests required to form a relationship are expressed by an affirmative act of the user, such as liking a collection, joining a group, following a collector, etc. Once a relationship is formed, the user may have access to the collection by browsing the collection, or through other means. For example, the user may experience the collection as a content feed on one or more interfaces. The content feed can include new content added to the collection. In one aspect, content from collections the user is following is selected for inclusion in a content feed based on the user's recent content browsing. In this way, a cross-site and cross curator content feed can be generated.

The first user 230 has a relationship with the first collection 210. The first user 230 does not have a relationship with any other collections on site A 201. The first user 230 may have relationships with other collections and/or curators on other sites not shown here. The second user 232 has a relationship with the first collection 210 and the second collection 214. The third user 234 has a relationship with the first curator 205. The relationship with the first curator 205 gives the user access to the first collection 210, the second collection 214, and the third collection 218. The fourth user 236 has a relationship with the first curator 205 and the Nth curator 207. The Nth user 238 has a relationship with the Nth curator 207 and with the second collection 214. As will be explained in more detail, user relationships can be used as a factor to determine whether curators and/or collections are similar. In general, the more users two different curators or collections have in common, the more similar the curators or collections.

Figure 3:
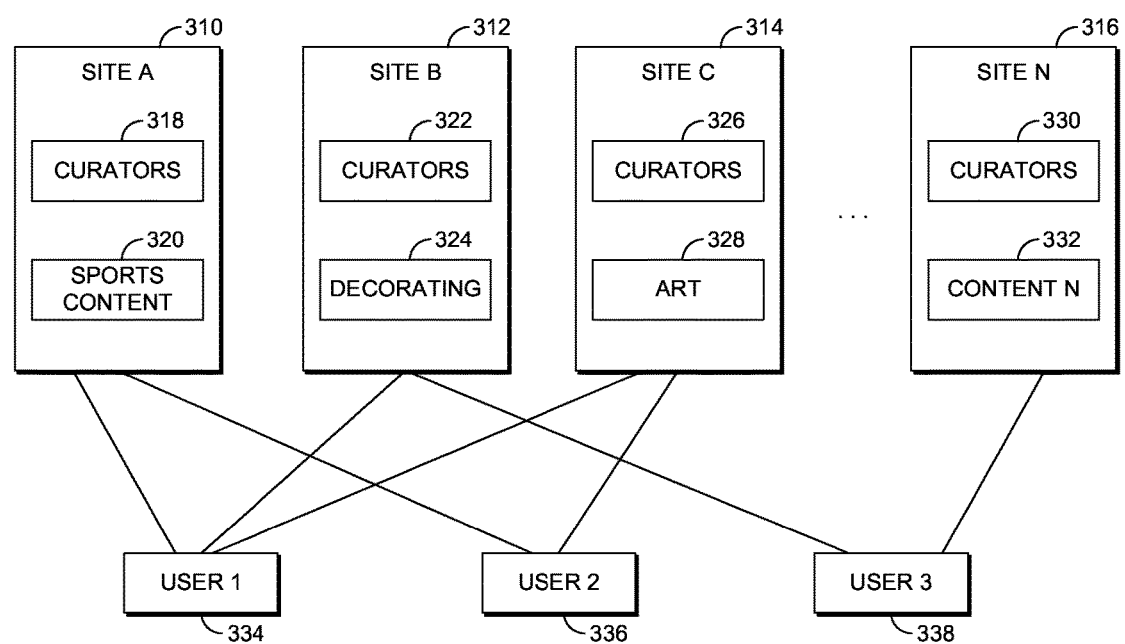
FIG. 3 is a diagram depicting relationships between users and curators within a content site, in accordance with an aspect of the technology described herein.

Turning now to FIG. 3, relationships between content sites and users are illustrated, in accordance with an aspect of the technology described herein. Computing environment 300 includes four different content sites. Aspects of the technology are not limited to use with four sites and could be used with hundreds or thousands of sites as is intended to be illustrated by the inclusion of the Nth site 316.

The four sites in computing environment 300 includes site A 310, site B 312, site C 314, and the Nth site 316. Each site includes curators and contents. The A site 310 includes a plurality of curators 318 and sports content 320. On the other hand, the B site 312 includes a plurality of curators 322 and decorating content 324. The C site 314 includes a plurality of curators 326 and art content 328. The Nth site 316 includes a plurality curators 330 and Nth content 332. The Nth content is not thematically specified herein, but could include content within one or more subject matters. Some content sites can be very general and have content on almost any topic. Other content sites can be quite specific and strive to provide content only related to the specific topic. Both types of content sites can be used with aspects of the technology described herein. When determining similarity, content sites with similar content can be given more weight when determining that curators are similar.

The three users include the first user 334, the second user 336, and the third user 338. Each of the users has relationships with one or more sites. A relationship with a site may be implicit, for example, simply navigating to a site may form a relationship as used herein. In other cases, a user may have a relationship with a site when he generates a user profile for the site or performs other affirmative steps to form a relationship with a site. The first user 334 has a relationship with the A site 310, the B site 312, and the C site 314. The second user 336 has a relationship with the A site 310 and the C site 314. The third user 338 has a relationship with the B site 312 and the Nth site 316.

When a user has not previously visited a site or otherwise does not have a relationship with a site, the user's relationships and activities on other sites may be used to recommend a curator for a new site. A recommendation can occur when a user first navigates to a site where the user is not following or having a relationship with existing curators. The recommendation can also be provided when a user receives search results where content from one or more sites with curators is provided in the search results. For example, search results could be provided identifying one or more items within the art content 328. In addition to presenting a direct link to the art content 328, one or more curators from the plurality of curators 326 on the C site 314 may be recommended to the user. The curators recommended could have included the content returned by the search results in one or more collections. The curators could be similar to curators followed by the user on other content sites. Data, including site relationships and curator relationships, can be collected from various sites to help form a user recommendation.

Turning now to FIG. 4, a computing system 400 suitable for implementing aspects of the technology described herein is provided. The computing system 400 includes an user device 410, a plurality of content sites 440, and a curator recommendation engine 430. System 400 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

In one embodiment, the functions performed by components of system 400 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 400 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 400, it is contemplated that in some embodiments functionality of these components can be shared or distributed across other components.

The user device 410 can take the form of any type of computing device, such as computing device 1000 described with reference to FIG. 10. Exemplary user devices 410 can include a mobile phone, a tablet, an e-reader, a personal computer, virtual reality glasses, augmented reality glasses, laptop, and such.

The user device 410 includes a personal assistant application 412, a user profile component 414, a browser application 416, and one or more content applications 418. An actual user device could include many other components that are not shown here for the sake of simplicity.

The personal digital assistant application 412 helps the user perform tasks through the one or more computing devices, such as client device 410 and other devices associated with the user. It should be noted that implementations of the technology described herein are not limited to use with a personal assistant application 412. The technology could be deployed with web browsers, specialty applications, social media applications, and such. A user is associated with the computing device when she uses the computing device on a regular basis. The user does not need to own the computing device, for example, a user's work computer could be owned by the employer but, nevertheless, be considered "associated with the user." Similarly, a user could share a family computer with multiple people, and the family computer can be considered "associated with the user." In one aspect, a user is able to designate the devices that he or she is associated with. In one aspect, a user is associated with each device on which an instance of the personal assistant application 412 is installed and on which the user has registered his or her account information or user identification with the personal digital assistant application.

The personal digital assistant application 412 can help the user complete both computing tasks, such as sending an email or submitting a search query, and real world tasks, such as scheduling a pickup time for a user's dry cleaning on the way home from work. Real world tasks, as used herein, occur, in part, outside of computers. For example, the exchange of physical good or services is an example of a real world task. Electronic tasks occur exclusively between computing devices and users of those computing devices. Displaying through a computer display or printing the result of a computerized communication have a real world element but are, nevertheless, considered electronic tasks for this application.

The personal digital assistant application 412 can monitor other applications and operating system functions. For example, the personal digital assistant application 412 may be able to monitor or have access to sensor data from one or more sensors on the client device 410. For example, the personal digital assistant application 412 may have access to accelerometer data, gyro data, GPS location data, Wi-Fi location data, image data from a camera, sound data generated by a microphone, touch data from a touchscreen, and other information. Sensor data from these sensors could be used to determine user interest in content and curators.

The personal digital assistant application 412 can monitor user activities within one or more other applications and store a record of this activity forming a personal data record. The user profile 414 can store details of events performed through the smartphone or other devices running an instance of the personal digital assistant application 412. For example, a user could form a relationship with a curator on a first content site. A record of that relationship could be stored in the user profile 414.

The personal assistant application 412 can generate an interface that displays curator recommendations to a user. The personal assistant application 412 can communicate with a curator recommendation engine 430 to receive curator recommendations. The personal assistant application 412 can initiate a search for curators of interest to a user by sending a request to the curator recommendation engine 430 to generate a curator recommendation for a user given a present context. The personal assistant application 412 can provide contextual details in the request, such as a search query entered, content site being visited, etc.

The user profile 414 can include information about the user of user device 410. The user profile component 414 can include information about a user's various accounts, including user IDs. The user profile information 414 can also include a semantic profile of a user's interests and activities.

The browser application 416 allows a user to view and interact with web pages. A user may have multiple browser applications on an user device, however, one is shown here for the sake of simplicity. The browser application 416 may be used to access one or more content sites over a wide area network, such as network 420. The browser 416 may receive cookies, including account login information and tracking information, for one or more content sites. The browser 416 can communicate information about the user's interactions with a content site to the user profile 414, the personal assistant 412, or a recommendation engine 430. In an aspect, users are provided an opt-in or opt-out that lets the user specify what information, if any, is shared with other components.

The content apps 418 can be special-purpose applications designed to allow the user to interact with content on a content site. The content apps 418 may include account information for the user that enables the content app to retrieve information of particular relevance to the user. For example, new content recommended by one or more curators the user is following on a particular content site may be added or displayed in an interface provided by the content apps. The content application 418 may provide a user the ability to interact with content, such as by posting comments about a particular content, liking various content, or performing other tasks through the content application 418. For example, the content application 418 may allow the user to purchase content or forward content to a friend via email, text message, or through some social media platform.

The content sites each include content 442, curators 444, and user records 446. The user records 446 may be generated when a user creates an account with a particular content site. Once an account is created, the user's interactions with content on a content site or the content site in general may be logged to develop user preferences. The user records 446 can also include an indication of the curators or contents the user interacts with. The curators 444 can create content collections that represent a subset of the total content 442 available through the content sites. The curators 444 may be human actors that view new content added to the content site and add content to the collection. An individual curator may have multiple collections delineated by subject matter, or some other organizational structure provided by the curator. As mentioned, the content can include media content such as images, videos, and audio files.

The content sites may be heterogeneous. As used herein, heterogeneous means that content, user data, curator data, and other features of content sites may be described differently on each site, for example using heterogeneous schemas. For example, the same content may be described using different nomenclature, attributes, and attribute values on different content sites. A user may have a unique user ID for each content site and different user aspects may be captured. The user's interaction with the content site may be described differently on different sites. Different sites may capture more or less data about user interactions than other content sites.

Aspects the technology described herein can reconcile heterogeneous data describing content, users, curators, collections and other content site features to generate recommendations and to identify similarity between content, curators, and collections. In one aspect, data from each site is mapped to a common schema to form common data. The common data is then used as input to the various components of the recommendation engine 430 describes subsequently. Although the data and content sites are not necessarily described as heterogeneous herein for the sake of simplicity, it should be understood that at in all examples given herein a conversion of data from various content sites into a common format may be completed.

The recommendation engine 430 includes user data component 452, curator data component 454, search records component 456, browsing records component 458, search component 460, content site data 462, content data 464, curator classification engine 466, curator similarity component 468, and curator recommendation component 470.

The user data component 452 is generally responsible for accessing or receiving (and in some cases also identifying) user data from one or more data sources, such as data sources 104a and 104b through 104n of FIG. 1. In some embodiments, user data component 452 may be employed to facilitate the accumulation of user data of a particular user (or in some cases, a plurality of users including crowd-sourced data) for curator classification engine 466, curator similarity component 468, or curator recommendation engine 470. The data may be received (or accessed), and optionally accumulated, reformatted, and/or combined, by user data component 452 and stored in one or more data stores, where it may be available to other components of system 400. For example, the user data may be stored in or associated with a user profile. In some embodiments, any personally identifying data (i.e., user data that specifically identifies particular users) is either not uploaded or otherwise provided from the one or more data sources with user data, is not permanently stored, and/or is not made available to other components without the user's express permission.

User data may be received from a variety of sources where the data may be available in a variety of formats. For example, in some embodiments, user data received via user data component 452 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; content interactions; curator interactions; online activity; searches; voice data such as automatic speech recognition; activity logs; communications data including calls, texts, instant messages, and emails; website posts; other user data associated with communication events; etc.) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data (which may include physiological data about the user such as heart rate, pulse oximeter or blood oxygen level, blood pressure, galvanic skin response, or other physiological data capable of being sensed or detected), other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

In some respects, user data may be provided in user-data streams or signals. A "user signal" can be a feed or stream of user data from a corresponding data source. For example, a content feed from one or more curators.

The curator data component 454 collects curator data from multiple content sites. The curator data can include a unique identifier for a curator. The curator data includes content associated with an individual curator within a content site. The content can be classified using automatic image classification, for example. The image classifier could be a machine-learning classifier that takes labeled image data as an input to build a model. The trained model can then take unlabeled images and use a similarity analysis to classify the image. Metadata associated with the curator and/or content associated with the curator could be mined for classification data. A group of individual users associated with a curator could be included with the curator data.

The search records component 456 collects and stores search records of the user. The search record can include a query submitted, search results presented, click data, and other actions taken in response to the search results.

The browsing records component 458 collects and stores browsing records for a plurality of users. A browsing record is a record of a website visited by a user. The browsing record can include the website, the user visiting the website, time spent on the website, actions taken by the user while visiting the website, time and date when the visit occurred, and such. The browsing records can be used to find similarities between users. For example, if a user views a first curator and then another curator, then a similarity could be inferred between curators when this pattern is repeated over a large group of users.

The search component 460 can take a query as input and output a search result responsive to the query. In one aspect, the search results component 460 outputs a search result page. For example, the user could submit a query where one or more content sites, or more specifically content within the content sites, are responsive to the query. The search results could include links to one or more content sites. The search component 460 can generate a search record for the search record component 456.

The content site data component 462 collects component data about various content sites. The content site data can include traffic patterns to a particular content site, account data for various users associated with a content site, popularity of various content within the content site, and such.

The content data 464 can include metadata describing content in one or more content sites. The content data could be indexed for presentation by the search component 460 in response to a relevant query. The content data 464 can include a list of curators associated with an individual content and/or users that like or have expressed a positive interest or a negative interest in a particular piece of content. Descriptions of the content, including classification data generated by an image classifier or another automated classification process, can be indexed for retrieval by a search engine and/or the recommendation component.

The curator classification engine 466 can assign an interest classification or multiple interest classifications to individual curators. For example, the curator could be assigned a particular subject matter classification such as sports images, home decorating, gardening, furnishings, etc. Sub-classifications within a particular classification are also possible. In one aspect, the curator classification engine 466 analyzes a content recommended by individual curators using image analysis as well as metadata associated with the content recommended by the curators to classify the curator. The site associated with the curator may also factor into the curator classification. The curator classification engine 466 may use a machine-learning module that receives labeled curator data as an input and learns to map the labeled data to various classifications. Once trained, the classification engine can take unlabeled curator data and assign a similar classification to it.

The classifying of curators can be based on feature-matching or determining similarity in features, which falls under pattern recognition. This type of classification may use pattern recognition, fuzzy logic, neural network, finite state machine, support vector machine, logistic regression, clustering, or machine-learning techniques, similar statistical classification processes, or combinations of these to classify a curator. For example, curator logic may specify types of metadata labels on curator content that are associated with a type of curator. Different patterns of features can be mapped to different classifications.

The curator similarity component 468 can generate a similarity score with other curators within an individual content site or within a different content site. In one aspect, the curator similarity component 468 uses a machine support vector analysis where each curator feature is a dimension within the vector and then calculates a vector similarity score between one or more different curators.

The curator recommendation component 470 can output a recommendation to a user. The curator recommendation component 470 can take a curator classification and a curator similarity score, as well as information known about the user, such as the user's interests, to generate a curator recommendation. For example, the user data may indicate that the user follows two curators on a first content site. The classification of those two curators, as well as the curator similarity with other curators that the user does not currently have a relationship with, may be analyzed to determine a recommendation for one or more curators.

In addition to recommending a curator, the technology described herein can recommend a collection. As mentioned, an individual curator can generate multiple collections. In some instances, the users interests do not map to all of the collections generated by curator. In another example, the users interests map more strongly to a particular collection generated by curator. In these and other situations, a recommendation for a particular collection may be generated. The user can then explore the collection and form a relationship with a collection and/or the curator as desired.

As part of the recommendation process, individual content within a collection can be recommended. For example, a recommendation for a curator or collection can include a picture of a particular media content within a collection or otherwise associated with the curator. In another example, individual content may be recommended as part of a content stream provided to the user. The content can be drawn from curators or collections the user already has a relationship with or from curators and collections the user does not have a relationship with but have been determined to be similar to those the user already has a relationship with.

Aspects of the technology described herein can provide a curator/collection interface. The curator collection interface can allow the user to explicitly provide user interest data that can be used to form recommendations. The recommendations described herein can be presented through the curator/collection interface. In another aspect, the curator/collection interface includes a content stream. The content stream can include selections of content from one or more curators the user has a relationship with. For example, all new content added to a collection the user has a relationship with can be shown in the user's content feed. In another example, all content added to any collection by a curator the user has a relationship with can be included in a content feed. In another aspect, content associated with curators or collections can be individually evaluated for inclusion in the content feed. For example, content matching a user's recently expressed interests can be included in the feed. The user's recently expressed interests can be explicit or implicit. Implicit interests can be derived from analysis of the user's browsing history, shopping history, search history, and such. In another aspect, content can be included because it is similar to content within collections the user has relationships with either directly or through a curator. The interface can provide a link to a content site, curator, and/or collection from which content is taken.

Figure 5:
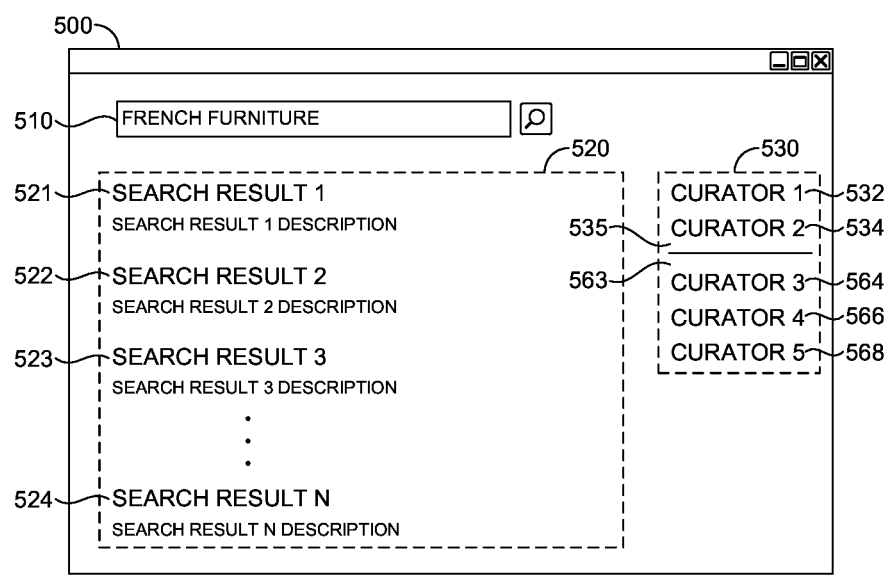
FIG. 5 is a diagram depicting a curator recommendation interface on a search results page, in accordance with an aspect of the technology described herein.

Turning now to FIG. 5, a search results interface 500 showing curator recommendations is illustrated, in accordance with an aspect of the technology described herein. The search results interface 500 includes a query box 510 with the query "French furniture." The search results 520 include a first search result 521, a second search result 522, a third search result 523, and an Nth search result 524. Each search result can include a description of the linked web page, including a thumbnail, or other content along with a hyperlink that the user can follow to access the web page. The search results could include one or more references to content sites that have curators.

In one aspect, a separate curator recommendation interface 530 is shown alongside the search results. The curator recommendation interface 530 includes a first recommendation section 535 for a first content site and a second recommendation section 563 for a second content site. The two sections may be delineated and labeled as related to a particular site. For example, a recommendation section may display branding and other style hints from the content site.

In one aspect, lines or other indications could be shown between a search result in a search result box and an associated curator interface. In addition to the name of a curator, a brief description of why the user may be interested in a curator may be included. For example, under curator 1 532, a description could indicate that curator 1 is similar to curator X that you follow on content site X. The first recommendation section 535 includes a recommendation for a second curator 534. A second recommendation section 563 includes recommendations for the third curator 564, the fourth curator 566, and the fifth curator 568.

Figure 6:
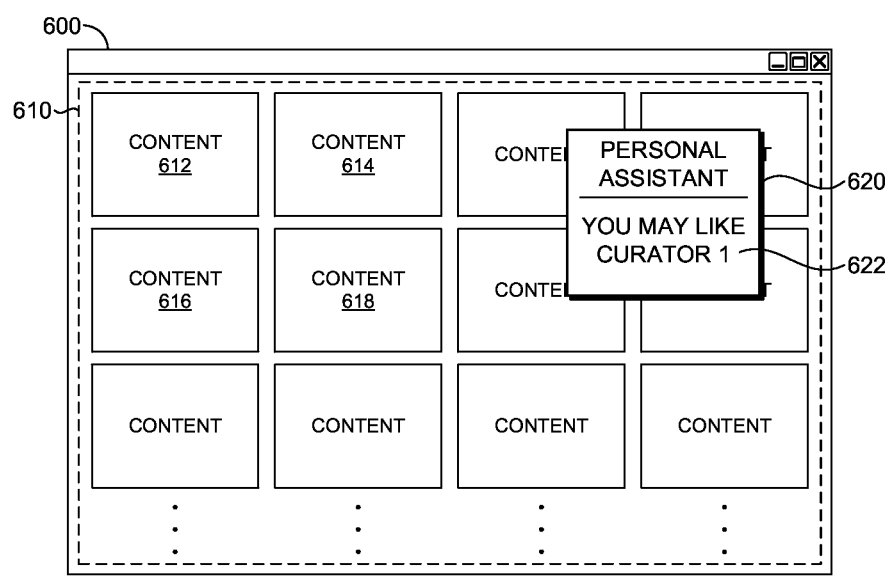
FIG. 6 is a diagram depicting a curator recommendation interface provided by a personal assistant, in accordance with an aspect of the technology described herein.

Turning now to FIG. 6, a content site with a curator recommendation is illustrated, according to an aspect of the technology described herein. The content site 610 is shown in a web browser 600, but aspects of the technology are not limited to a web browser. For example, a content site application could show a content stream from a particular content site. The content interface 610 includes content 612, content 614, content 616, and content 618. Other content is shown but not labeled. The content could be pictures, videos, or other content. The user may scroll or pan through content and click on individual content items to bring up a larger view. In one aspect, the content items are thumbnails of a larger content. The content may include descriptions and links.

The curator recommendation interface 620 can be provided by a personal assistant application running on the user's device, the server, or a combination of both. The recommendation indicates that the user may like curator 1 622. The user could then click on part of the recommendation interface to be taken to curator 1's content and possibly be given an option to follow or form another relationship with the curator. Different content sites use different terminology to describe forming a relationship with the curator. The personal assistant application can provide the recommendation 620 as a pop-up interface that obscures the content. In another aspect, the recommendation could be spoken to the user or provided in some other mechanism. In one aspect, the personal assistant application provides a recommendation within a task or general recommendation pane that is quite apart from the content site.

Figure 7:
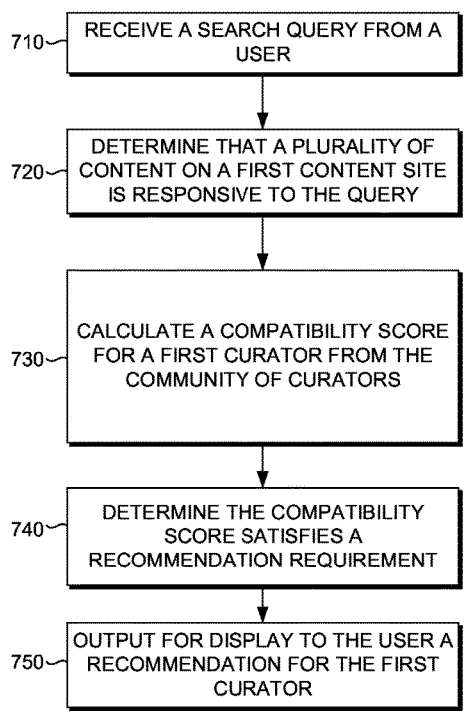
FIG. 7 is a diagram depicting a method for recommending a curator, in accordance with an aspect of the technology described herein.

Turning now to FIG. 7, a method 700 of recommending a curator to a user is provided, in accordance with an aspect of the technology described herein. Method 700 could be performed by a system that includes a curator recommendation engine, such as curator recommendation engine 430, described previously with reference to FIG. 4.

At step 710, a search query is received from a user. The search query may be input into a search page, such as a search page provided by an online search engine. The search query could also be input into a search box on a content site, within a search application, into a personal assistant application, or into some other search functionality built into an application or provided as an online service. The search query may be specifically associated with a user that has an account with a search service or other search functionality. For example, the user may provide a search query to an application running on a user device associated with the user. In another aspect, an online search service is able to associate account information with a user and link a user to the search query, for example, using a browser cookie.

At step 720, a plurality of content on a first content site is determined to be responsive to the query. The first content site comprises a community of curators. As mentioned previously, the curators can generate one or more content collections that can be accessed by users. In one aspect, the user subscribes to the content collection or curator to form a relationship with the curator. The content can be determined to be responsive to the query through keyword matching, image analysis, and other methods used by search services to match a query to content.

In one aspect, the content may be on multiple content sites. The method 700 could be repeated with each content site that includes content responsive to the search query or a subset of top ranked content sites. The content sites and content can be ranked in terms of relevance to the user.

At step 730, a curator recommendation engine or other component can calculate a compatibility score for a first curator from the community of curators on the first content site. The compatibility score measures a conformity between a style for the user and a style for the first curator. The style can be determined indirectly using features of a curator and features of a user as a proxy for "style." Any feature related to user interests could be used. When the user features and curator features are similar, then a high degree of conformity can be determined. A high conformity can indicate that the user and the curator have a similar style and that the user is likely to be interested in content recommended by the curator.

The compatibility score can be calculated using a single function or can be calculated using a series of functions with the result of each of the series of functions being given different weight in the compatibility score. For example, a similarity score may be used to determine a similarity between curators the user already follows and the first curator. A high degree of similarity can contribute to a high compatibility score. Functions can be used to classify the curator interests and the user interests. Different functions may be used to classify the user interests and the curator interests, but the results of the two functions can be combined in a way that allows for comparison of the interests of the user and the curator. In one aspect, data, such as content recommended by the curator and a curator profile, is mined to determine curator interests. In addition, data about the first content site can be used to determine curator interests. Similarly, user demographic information, user browsing history, user search history, and other user profile information can be used to determine user interests. In addition, user relationships with curators and interactions with content on one or more content sites can be used to determine user interests. A similarity between user interests and a curator's interests can be an input into the compatibility score.

In one aspect, a machine classifier is used to calculate the compatibility score. The machine classifier may take user information and curator information as input and output compatibility scores with one or more curators.

At step 740, the compatibility score is determined to satisfy a recommendation requirement. The recommendation requirement may be editorially set by a person. In another aspect, the recommendation requirement is met when a machine-learning algorithm evaluates the compatibility score, and possibly other factors, to determine whether the compatibility score satisfies a recommendation requirement.

At step 750, a recommendation for the first curator is output to the user. The recommendation may be output through a search results page, such as is illustrated with reference to FIG. 5, on a content site page, such as is illustrated in FIG. 6, or through some other mechanism. The curator recommendation can identify a curator by name, include a description of the curator, and can include a reason why the user may have an interest in the curator. For example, the curator recommendation could say that the first curator is similar in style to one or more curators the user currently has a relationship with. In one aspect, the rationale or reason that the user may be interested in the curator is generated by selecting one of several recommendation templates and then inputting specific data into the templates. For example, a blank template could say that "You may enjoy curator X because curator X is similar to curator Y whom you follow." To form a recommendation, the X and Y can be replaced with the name of curators.

In one aspect, the method 700 is performed when the user does not currently follow any curators from the first community of curators on the first site. In another aspect, method 700 is performed even though the user follows some curators from the first community of curators, but not a curator that has recommended the content that is responsive to the search query. In a further aspect, the method 700 is performed to recommend additional curators that the user does not currently have a relationship with.

Figure 8:
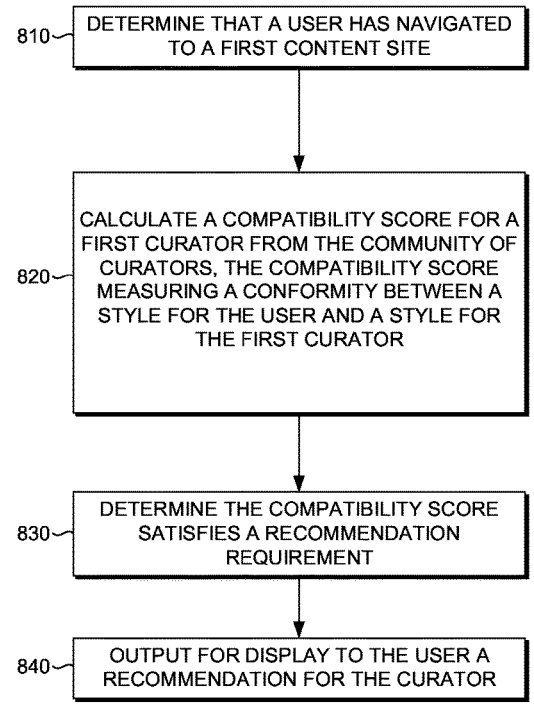
FIG. 8 is a diagram depicting a method for recommending a curator, in accordance with an aspect of the technology described herein.

Turning now to FIG. 8, a method 800 for recommending a curator to a user is provided, in accordance with an aspect of the technology described herein. Method 800 could be performed by a system that includes a curator recommendation engine, such as curator recommendation engine 430, described previously with reference to FIG. 4.

At step 810, a user is determined to have navigated to a first content site. A user may navigate to a first content site using a web browser or other application that allows the user to visit a content website. In one aspect, the user has no current relationships with a curator on the first content site. The content site has several curators available for users to follow. Each curator recommends a plurality of content to the user.

The technology can determine that the user navigated to the first content site by monitoring the user's browsing history. For example, a personal assistant application could monitor a user's browsing behavior to determine that the user navigated to a first content site. The personal assistant may have a list of content sites where the personal assistant can provide curator recommendations. For example, a plurality of content sites may agree to provide curator data to a curator recommendation service that provides information to a personal assistant application. In return for curator information and user data, the content sites may also be eligible to receive curator recommendations from the curator recommendation service. This allows individual content sites to be able to recommend curators without any direct knowledge of a user.

At step 820, a curator recommendation engine or other component can calculate a compatibility score for a first curator from the community of curators associated with the first content site. The compatibility score measures a conformity between a style for the user and a style for the first curator. Calculation of a compatibility score has been described previously. At step 830, the compatibility score is determined to satisfy a recommendation requirement.

At step 840, a recommendation for the first curator is output for display to the user. Various methods for outputting a recommendation have been described previously.

In one aspect, a curator classification is used to generate the compatibility score. The curator classification is generated by a classifier application that analyzes curator features to assign one or more curator classifications to the curator. For example, the classifications can include subject matter classifications as well as other stylistic features, such as design schools, architectural styles, etc. In one aspect, the curator features are derived from an automated analysis of images within content of a collection generated by the curator. In this case, the image analysis means analysis of the pixels within an image rather than metadata associated with an image. A separate metadata analysis of content can be included when generating a curator classification, a compatibility score, or other analysis used with method 800 or other methods and processes described herein.

Figure 9:
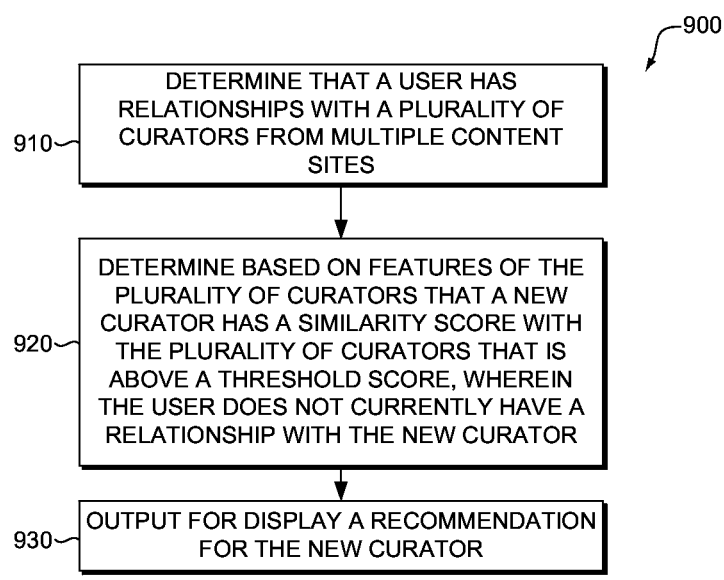
FIG. 9 is a diagram depicting a method for recommending a curator, in accordance with an aspect of the technology described herein.

Turning now to FIG. 9, a method 900 of recommending a curator to a user is provided. Method 900 could be performed by a system that includes a curator recommendation engine, such as curator recommendation engine 430, described previously with reference to FIG. 4.

At step 910, the user is determined to have a relationship with a plurality of curators from multiple content sites. As used herein, a relationship means the user has affirmatively expressed an interest in the curator. For example, the user may like or follow a curator.

At step 920, a similarity score for a new curator is determined. The similarity score is based on features of the plurality of curators and features of the new curator. The similarity score measures a similarity between the plurality of curators the user already has a relationship with and the new curator. The user does not currently have a relationship with the new curator. Further, the similarity score can be determined to be above a threshold score that is associated with providing a recommendation for the curator to the user.

The similarity score between the plurality of curators a user already has a relationship with and a first curator may be determined, in part, by analyzing how many unique users follow both the first curator and one or more of the plurality of curators that the user already has a relationship with. In general, the more users in common, the more similar the curators may be. The total number of users following an individual curator may be taken into consideration. For example, a curator that has hundreds of thousands of followers may be expected to have a great number of followers in common with other curators than would a curator with 100 followers. In one aspect, the number of followers in common can be adjusted by the total number of followers following an individual curator. In another aspect, the number of unique users in common can be expressed as a percentage of the total users following an individual curator.

In one aspect, the similarity score is calculated using a vector analysis where features of individual curators form vector dimensions. A comparison of vectors is made to calculate a similarity score. The similarity score can also be calculated using users-in-common as an input. As explained previously, the users-in-common is a measure of how many users the new curator has in common with one or more curators the user already has a relationship with. A similarity score could be calculated between any two or more curators.

At step 930, a recommendation for the new curator is output for display. Various interfaces for providing a recommendation to the user have been described previously.

Exemplary Operating Environment

Figure 10:
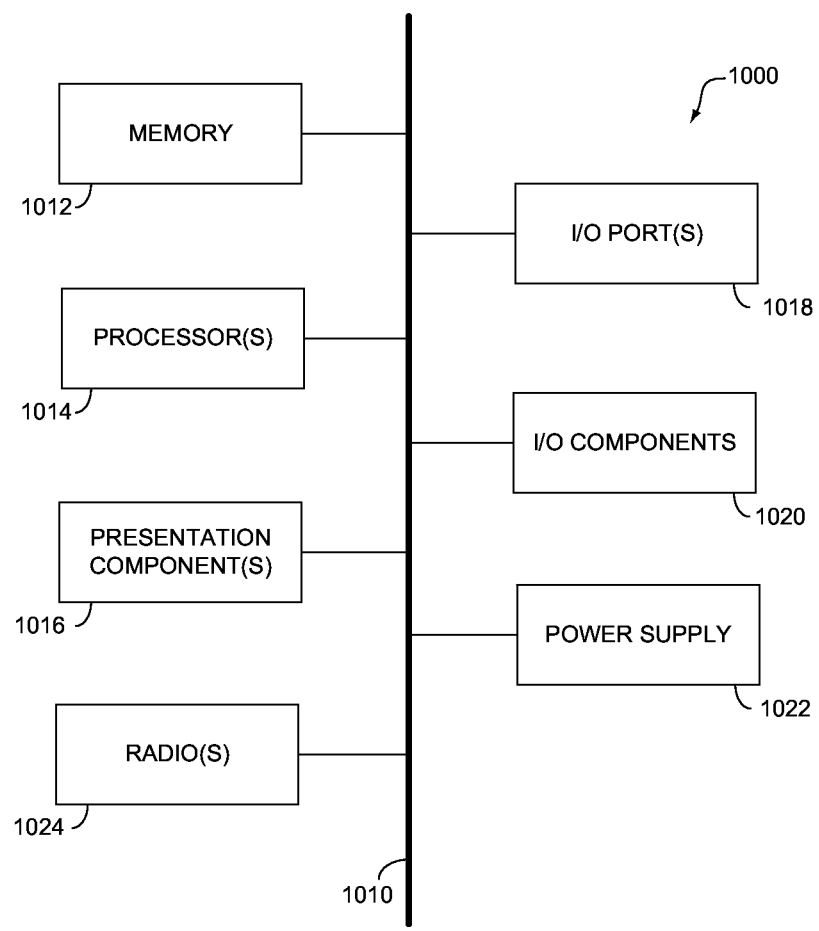
FIG. 10 is a block diagram of an exemplary computing environment suitable for implementing aspects of the technology described herein.

Referring to the drawings in general, and initially to FIG. 10 in particular, an exemplary operating environment for implementing aspects of the technology described herein is shown and designated generally as computing device 1000. Computing device 1000 is but one example of a suitable computing environment and is not intended to suggest any limitation as to the scope of use of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 10 and refer to "computer" or "computing device." The computing device 1000 may be a PC, a tablet, a smartphone, virtual reality headwear, augmented reality headwear, a game console, and such.

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices, including I/O components 1020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

The computing device 1000 may include a radio 1024. The radio transmits and receives radio communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A search server comprising:
a processor; and
a computer storage memory having computer-executable instructions for a monitoring application stored thereon which, when executed by the processor, implement a method for recommending a curator, having one or more content collections, to a user, the method comprising:
receiving a search query from a user through a search interface of an online search engine;
determining that a plurality of content on a first content site is responsive to the query, and the content site is separate from the online search engine;
determining the user does not currently follow any curators on the content site;
based on the determination that the user does not currently follow any curators on the content site, calculating a compatibility score for a first curator from the community of curators, the compatibility score measuring a conformity between a style for the user and a style for the first curator, wherein the style for the user is determined using interaction data describing interactions with content on a second content site that is separate from the first content site, and wherein the style of the first curator is determined from content recommendations made by the first curator;
determining the compatibility score satisfies a recommendation requirement; and
upon said determining the compatibility score satisfies the recommendation requirement, outputting for display to the user a recommendation for the first curator.

2. The search server of claim 1, wherein the recommendation is output on a search results page provided in response to the query.

3. The search server of claim 1, wherein the style for the user is determined using a computer learning model that assigns one or more classifications to the user taking relationships the user has with other curators on one or more content sites other than the first content site as input.

4. The search server of claim 1, wherein the method further comprises building a curator co-relation model that comprises a similarity score for curators in different content sites, wherein the similarity score is used to calculate the compatibility score.

5. The search server of claim 4, wherein the similarity score between a first curator in the first content site and a second curator in a second content site is based on an amount of common content being recommended by both the first curator and the second curator.

6. The search server of claim 4, wherein the similarity score between a first curator in the first content site and a second curator in a second content site is based on an amount of unique users that have relationships with both the first curator and the second curator.

7. The search server of claim 1, wherein the recommendation for the first curator is output through a personal digital assistant interface after the user navigates to the first content site in response to clicking on a search result.

8. A method for recommending a curator to a user comprising:
determining that a user has navigated to a first content site that is associated with a community of curators;
determining that the user has not previously visited the first content site;
based on the determination that the user has not visited the first content site previously, calculating a compatibility score for a first curator from the community of curators, the compatibility score measuring a conformity between a style for the user and a style for the first curator, wherein the style for the user is determined using interaction data describing interactions with content on a second content site that is separate from the first content site and relationships with content curators on the second site, and wherein the style of the first curator is determined from content recommendations made by the first curator;
determining the compatibility score satisfies a recommendation requirement; and
outputting for display to the user a recommendation for the first curator.

9. The method of claim 8, wherein the compatibility score comprises a similarity score and a curator classification.

10. The method of claim 9, wherein the curator classification is generated by a classifier application that analyzes curator features to assign one or more curator classifications to the curator.

11. A method of claim 10, wherein one of the curator features is derived from an automated analysis of images of content within a collection generated by the curator.

12. The method of claim 8, wherein the recommendation for the curator is output through an interface generated by a personal assistant application.

13. The method of claim 8, wherein the method further comprises communicating the recommendation for the curator to the content site, and wherein the recommendation for the curator is output through an interface generated by the content site.

14. A method for recommending a curator to a user, the method comprising:
determining that a user has relationships with a plurality of curators from multiple content sites;
determining that a user has not visited a first content site previously;
based on the determination that a user has not visited the first content site, determining based on features of the plurality of curators that a new curator from the first content site has a similarity score with the plurality of curators that is above a threshold score, wherein the user does not currently have a relationship with the new curator; and outputting for display a recommendation for the new curator.

15. The method of claim 14, wherein the similarity score is calculated using a vector analysis where features of individual curators form vector dimensions.

16. The method of claim 14, wherein the similarity score is calculated using users-in-common as an input, wherein users-in-common is an amount of users two curators have in common.

17. The method of claim 14, wherein the recommendation is output by a personal assistant application in a context where the user is seeking content related to the curator.

18. The method of claim 14, wherein a relationship between the user and a curator is formed when the user affirmatively follows the curator.

* * * * *